United States Patent [19]

Montes

[11] 4,361,337
[45] * Nov. 30, 1982

[54] PISTON RING WITH TONGUE AND GROOVE JOINT

[76] Inventor: Adriel Montes, P.O. Box 39212, Detroit, Mich. 48239

[*] Notice: The portion of the term of this patent subsequent to Feb. 17, 1998, has been disclaimed.

[21] Appl. No.: 234,155

[22] Filed: Feb. 13, 1981

Related U.S. Application Data

[63] Continuation-in-part of Ser. No. 39,306, May 15, 1979, Pat. No. 4,251,083.

[51] Int. Cl.³ .............................................. F16J 9/14
[52] U.S. Cl. ................................................... 277/221
[58] Field of Search ........................ 277/221, 222, 220

[56] References Cited

U.S. PATENT DOCUMENTS

| | | | |
|---|---|---|---|
| 2,397,753 | 4/1946 | Sale | 277/221 |
| 3,261,612 | 7/1966 | Cames | 277/221 |
| 4,251,083 | 2/1981 | Montes | 277/221 |

*Primary Examiner*—Robert I. Smith
*Attorney, Agent, or Firm*—Charles W. Chandler

[57] ABSTRACT

A piston ring having its ends shaped to form a tongue and groove joint disposed at an angle of about 45° with respect to the cylinder contact surface, the tongue having a hook-shaped structure receivable in a slot in the base of the groove of the other end of the ring.

11 Claims, 7 Drawing Figures

PISTON RING WITH TONGUE AND GROOVE JOINT

CROSS REFERENCE TO RELATED APPLICATION

This application is a continuation-in-part of application Ser. No. 39,306 filed May 15, 1979 for PISTON RING WITH TONGUE AND GROOVE JOINT which has been issued as U.S. Pat. No. 4,251,083.

BACKGROUND OF THE INVENTION

This invention is related to piston rings, and more particularly, to a one-piece piston ring having one end slidably receivable within the other end by relative motion between the two ends in a non-parallel direction with respect to the ring contact surface.

In my aforementioned co-pending patent application, a novel form of ring was disclosed having its ends formed with a tongue and groove joint so as to be relatively slidably removable at an angle of about 45° with respect to the surface of the ring that slidably engages the cylinder wall. Although such an arrangement provides improved sealing properties with respect to conventional commercial rings, it is difficult to mount such a ring in those cylinders in which the piston and ring are first passed through a larger cylinder chamber. The problem is that the ends of the ring become separated before they are received into the smaller cylinder.

SUMMARY OF THE INVENTION

The broad purpose of the present invention is to provide an improved tongue and groove piston ring of the aforementioned type in which the tongue has a hook-shaped structure engaged with the base of the groove to form a connection preventing longitudinal separation of the ring ends.

The advantage of such an arrangement is that the user can mount the ring in the slot of the piston, locking the two ends together and then insert the piston end ring into the cylinder without the ends of the ring becoming separated.

Still further objects and advantages of the invention will become readily apparent to those skilled in the art to which the invention pertains upon reference to the following detailed description.

DESCRIPTION OF THE DRAWING

The description refers to the accompanying drawing in which like reference characters refer to like parts throughout the several views, and in which.

DESCRIPTION OF THE PREFERRED EMBODIMENT

Figure 1:
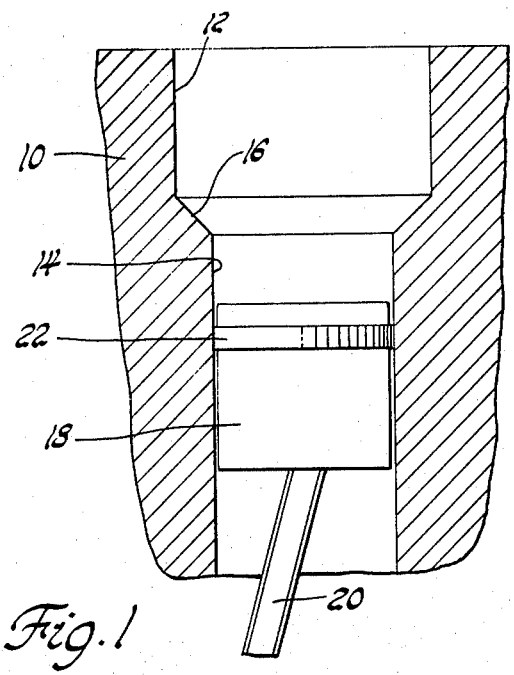
FIG. 1 is a sectional view through an engine having a larger chamber, and a smaller chamber with a piston having a ring illustrating the preferred embodiment of the invention.

Referring to the drawing, FIG. 1 illustrates a fragmentary viewing of an engine 10 having an upper cylindrical chamber 12 and a lower cylindrical chamber 14. The lower chamber has a smaller diameter than the upper chamber. The two chambers are being joined together by a bevelled section 16. A piston 18 is mounted in chamber 14 and connected by piston rod 20 to a suitable drive means (not shown). A piston ring 22 is mounted in a slot (not shown) of the piston so as to be slidably mounted in chamber 14. Ring 22 is preferably an oil ring to provide a sliding seal between the piston and the chamber wall as the piston is being reciprocated. Thus the piston is exposed to a variable pressure at the upper end of chamber 14.

Referring to FIGS. 2 to 6, ring 22 is formed of a metal, preferably of cast iron, however, it can be formed of a variety of other suitable materials. The ring is slightly resilient and split to form a pair of ends 24 and 26. The ring has a cylinder contact surface 28 for slidably engaging the wall of chamber 14, a top surface 30, which faces toward chamber 12, a bottom surface 32 on the bottom side of the ring, and an inside surface 34. The spaced ends permit the user to pass the ring along the piston before the ends are locked together in the piston ring slot.

End 26 has a groove 40. Groove 40 has a pair of spaced parallel sides 42 and 44 formed at an angle of approximately 45° with respect to sides 30 and 32 of the ring. A slot 46 is formed in wall 44 and the base of the groove, the side walls of the slot being perpendicular to wall 44.

The other end 24 of the ring has a tongue 50 having parallel sides 52 and 54. The thickness of the tongue, that is the distance between sides 52 and 54, accomodates the distance between walls 42 and 44 so that the tongue is slidably receivable between the walls. The tongue has a lip 56 having a cross section accomodating the cross section of slot 46 so that the lip can be received within slot 46. The arrangement is such that the tongue can be received within the groove by a motion at 45° with respect to the upper and lower sides of the ring end, that is, in a direction from one corner of the ring cross section toward the other corner. When the tongue is received within the groove, the engagement between the two ends is such that the ends cannot be separated in the ring's longitudinal direction.

Normally, the variable pressure at the head of piston 18, coupled with the reciprocating piston motion within the cylinder, tends to cause relative motion between the ring ends. The opposed walls of the tongue and groove are such that if the piston is being moved in one direction, the tongue engages wall 44, and if the piston is being moved in the opposite direction, the tongue engages the opposite wall 42 thereby providing a joint having minimal gas blow-by. Thus, the piston ring provides a seal that responds to gas pressure in either direction of motion of the piston.

The hook-like arrangement of the tongue and groove provides a still further advantages in that it permits the user to engage the two ends of the rings in the piston slot and then insert the slot through the upper cylinder 12 without the ring ends separating as the piston is moved down toward the smaller chamber.

Figure 7:
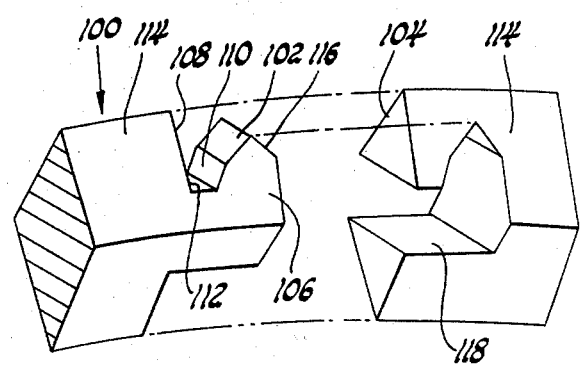
FIG. 7 is a perspective view of another embodiment of the invention.
Figure 2:
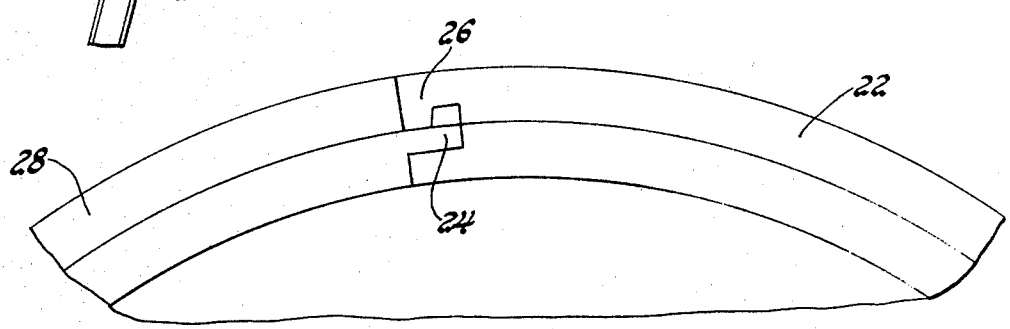
FIG. 2 is an enlarged perspective view of the ring showing its ends locked together.
Figure 3:
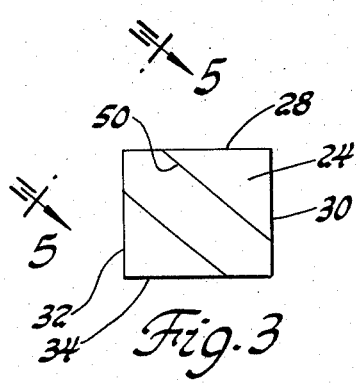
FIG. 3 is a view of one end of the preferred ring.
Figure 4:
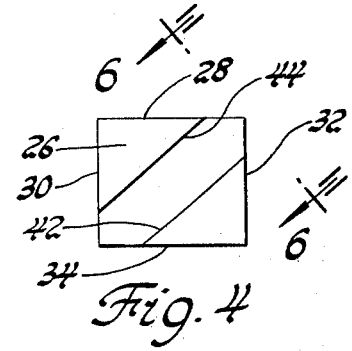
FIG. 4 is a view of the other end of the ring.
Figure 5:
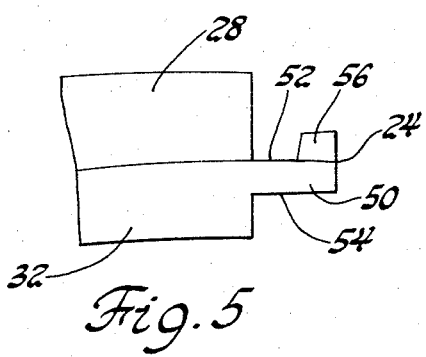
FIG. 5 is a view as seen along lines 5—5 of FIG. 3.
Figure 6:
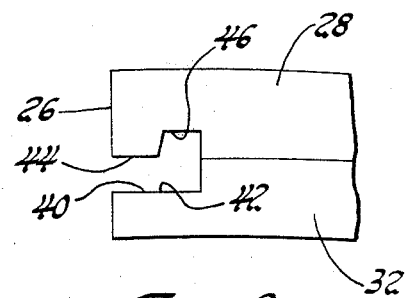
FIG. 6 is a view as seen along lines 6—6 of FIG. 4.

FIG. 7 illustrates another embodiment of the invention in which piston ring 100 has a pair of ends 102 and 104. End 102 is formed with a hook shaped structure 106 defined by a pair of parallel opposed walls 108 and 110. Walls 108 and 110 define a channel 112 that extends at 45° with respect to the surface 114 of the ring that faces the chamber wall. End 102 is similar to the embodiment of FIGS. 1 to 6 except that the ring end has a pointed section 116 at the extreme end of the hook.

The other end 104 is formed with a channel 118 that is complementarily shaped to the end 102 so that end 102 may be slidably received into channel 118. Channel 118 also extends at a 45° direction with respect to surface 114.

Having described my invention, I claim:

1. A piston ring comprising an elongated one-piece element having a cylinder contact surface, a side surface extending the length of said element and a pair of relatively movable ends including a first end and a second end, said first end having a groove including a pair of generally opposed walls, said walls being planar and parallel with respect one to the other and being disposed at an angle of about 45° with respect to said ring side surface, the second end being receivable in said groove to prevent relative motion between the ends of the ring in directions normal to said side surface; and structure on said second end engageable with complementary structure on the first end for preventing longitudinal motion of the first end with respect to the second end.

2. A piston ring comprising an elongated one-piece element having a cylinder contact surface, a side surface extending the length of said element and a pair of relatively movable ends including a first end and a second end, said first end having a groove including a pair of generally opposed walls, said walls being planar and parallel with respect one to the other and being disposed at an angle less than 90° with respect to said ring side surface, the second end being receivable in said groove to prevent relative motion between the ends of the ring in directions normal to said side surface, said element having a generally rectangular cross section, the parallel walls of said groove being spaced on opposite sides of a pair of non-adjacent corners of said side section, and structure on said second end engageable with complementary structure on the first end for preventing longitudinal motion of the first end with respect to the second end.

3. A piston ring comprising an elongated one-piece element having a cylinder contact surface, a side surface extending the length of said element and a pair of relatively movable ends including a first end and a second end, said first end having a groove including a pair of generally opposed walls, said groove having ends opening on opposite sides of said element, the second end being receivable in said groove to prevent relative motion between the ends of the ring in directions normal to said side surface, and being movable through each of the ends of said groove in a direction of about 45° with respect to said ring side surface, and structure on said second end engageable with complementary structure on the first end for preventing longitudinal motion of the first end with respect to the second end.

4. A piston ring comprising an elongated one-piece element having a cylinder contact surface, a side surface extending the length of said element adjacent said cylinder contact surface, a pair of relatively movable ends including a first end and a second end, said first end having a groove, the second end having a tongue defined by a pair of planar parallel sides disposed at an angle less than 90° but greater than 0° with respect to said ring side surface, said tongue being receivable in said groove to prevent relative motion between the ends of the ring in directions normal to said side surface, and structure on said tongue engageable with complementary structure in the groove for preventing longitudinal motion of the tongue with respect to the groove.

5. A piston ring as defined in claim 4, in which the parallel sides of said tongue are disposed at an angle of about 45° with respect to said ring side surface.

6. A piston ring as defined in claim 4, in which the ring has a generally rectangular cross section and the parallel sides of said tongue are spaced on opposite sides of the pair of non-adjacent corners of said cross section.

7. A piston ring as defined in claim 4, in which said tongue is slidably receivable within said groove.

8. A piston ring as defined in claim 4, in which said groove has a pair of opposed spaced parallel sidewalls slidably receiving said tongue.

9. A piston ring as defined in claims 1 or 2, in which the second end of the ring is slidably receivable within the parallel walls of said groove.

10. A piston ring as defined in claims 1 or 2, in which the second end of the ring has a reduced thickness defining a pair of planar parallel walls on opposite sides of said reduced end such that the second end is slidably receivable within the parallel walls of said first end.

11. A piston ring comprising an elongated one-piece element having a cylinder contact surface, a side surface extending the length of said element and a pair of relatively movable ends including a first end and a second end, said first end having a groove including a pair of generally opposed walls, said walls being planar and parallel with respect to one another but not parallel with respect to said ring side surface, said groove having ends opening in opposite sides of said element, the second end having a tongue receivable in said groove to prevent relative motion between the ends of the ring in directions normal to said side surface, said tongue being movable through both ends of said groove in directions forming an angle greater than 0° but less than 90° with respect to said ring side surface, and structure on said second end engageable with complementary structure on the first end for preventing longitudinal motion of the first end with respect to the second end.

* * * * *